United States Patent [19]
Lebo

[11] 4,026,639
[45] May 31, 1977

[54] STEREO VIEWER EYEGLASS FRAME

[75] Inventor: Donald G. Lebo, Bridgeport, Conn.

[73] Assignee: The Raymond Lee Organization, Inc., New York, N.Y.

[22] Filed: Dec. 9, 1975

[21] Appl. No.: 639,212

[52] U.S. Cl. .................................. 351/50; 351/57; 351/61; 351/121; 350/98; 350/298

[51] Int. Cl.² ........................................ G02C 7/14

[58] Field of Search ............... 351/50, 57, 61, 84, 351/168, 172, 121; 350/98, 298

[56] References Cited

UNITED STATES PATENTS

| 3,045,544 | 7/1962 | Schmidt | 351/57 X |
|---|---|---|---|
| 3,058,392 | 10/1962 | Primeau | 351/50 X |
| 3,498,701 | 3/1970 | Miller | 351/172 X |

FOREIGN PATENTS OR APPLICATIONS

| 774,531 | 12/1934 | France | 351/50 |
| 848,715 | 7/1949 | Germany | 351/50 |

*Primary Examiner*—Saxfield Chatmon, Jr.
*Attorney, Agent, or Firm*—Howard I. Podell

[57] ABSTRACT

An eyeglass frame fitted with mirrors so as to direct the vision from each eye to a different point when both eyes are similarly focused. Each of the two lens frames of the unit are mounted by a hinge to a bridge joining the two lens frames, and each temple of the unit is fitted by a turnbuckle to the side of one lens frame. A pair of mirrors are pivotally mounted to each lens frame with each mirror fitted to an axle that is rotatably mounted to the frame and with both axles being mounted along parallel axes. The mirrors are oriented so that the first mirror of each set reflects light to the eye from the surface of the second mirror of the set, which second mirror is set to reflect from in front of the observer to the first mirror.

2 Claims, 5 Drawing Figures

U.S. Patent  May 31, 1977  4,026,639
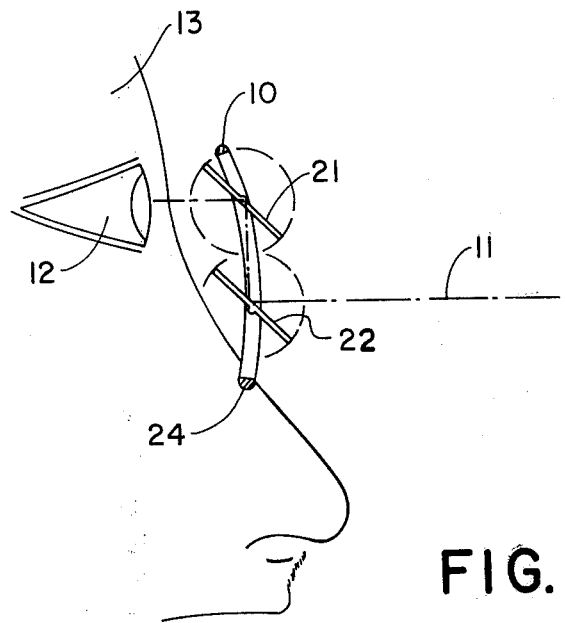
FIG. 1
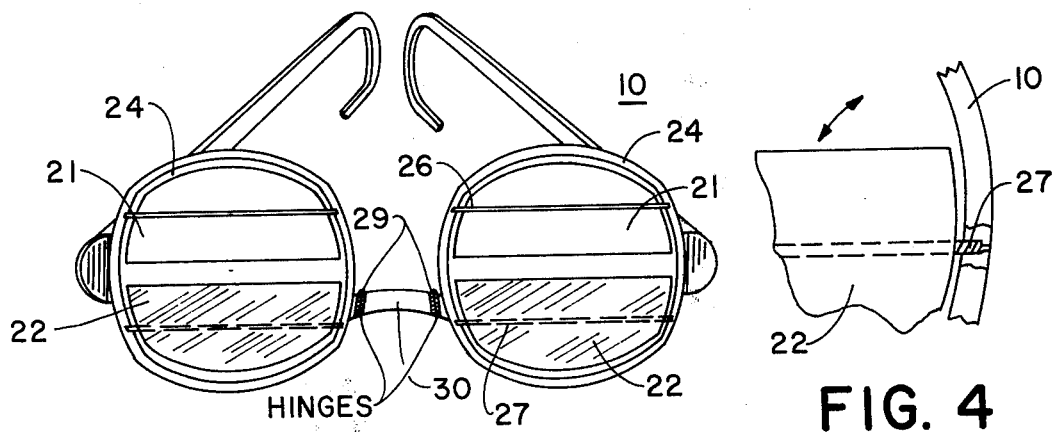
FIG. 2
FIG. 4
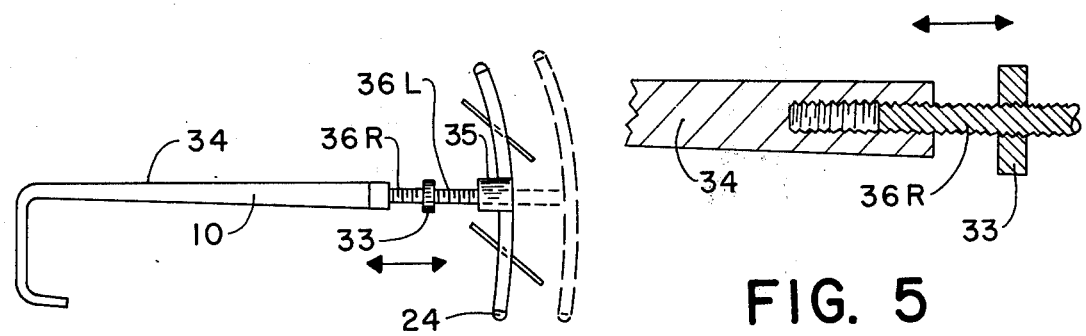
FIG. 3
FIG. 5

STEREO VIEWER EYEGLASS FRAME

SUMMARY OF THE INVENTION

My invention is an eyeglass frame fitted with mirrors so as to direct the vision from each eye to a different point when both eyes are similarly focused. Each of the two lens frames of the unit are mounted by a hinge to a bridge joining the two lens frames, and each temple of the unit is fitted by a turnbuckle to the side of one lens frame. A pair of mirrors are pivotably mounted to each lens frame with each mirror fitted to an axle that is rotatably mounted to the frame and with both axles being mounted along parallel axes. The mirrors are oriented so that the first mirror of each set reflects light to the eye from the surface of the second mirror of the set, which second mirror is set to reflect from in front of the observer to the first mirror.

The eyeglass frame achieves a stereo effect when employed to view a standard motion picture screen or alternately the eyeglasses may be employed to view a motion picture in which the scenes for each eye are displayed separately from each other, with each eye viewing only the scenes that the mirrors of its lens frame is focused upon.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a side view of the invention is use;
FIG. 2 is a perspective view of the invention;
FIG. 3 is a side view of the invention;
FIG. 4 is a fragmentary view of the invention; and
FIG. 5 is a sectional view of the turnbuckle of the temple of the invention.

DESCRIPTION OF THE PREFERRED EMBODIMENT

Turning now descriptively to the drawings, in which similar reference characters denote similar elements throughout the several views, FIGS. 1-5 illustrate the stereo eyeglass frame 10 which enables the focusing of the line of sight 11 of each eye 12 of a viewer 13 upon a different point.

The frame 10 is fitted with two pivotably mounted mirrors 21 and 22 in each lens frame 24.

The mirrors 21 and 22 are mounted in this embodiment about axles 26 and 27 that are parallel to each other and extend in the horizontal plane, when the frame 10 is worn, but other embodiments may mount axles 26 and 27 on vertical or diagonal axes.

Upper mirrors 21 are each rotated axle 26 to focus the line of view 11 from the lower associated mirror 22 to the eye 12. Lens frames 24 are pivotably mounted on hinges 29 to the common bridge 30 with the hinge axes being generally perpendicular to the mirror axles 26 and 27. A turnbuckle 33 joins each temple piece 34 to provide for adjustment of the angle of the plane of each lens frame 24 about its hinge 29. Turnbuckle 33 is formed of a right hand male thread 36R and a left hand male thread 36L fastened to mating female threads in the temple piece 34 and a barrel 35 extending from the lens frame 24.

Alternately each lens frame may be joined to a temple piece of fixed length and the angular adjustment of the plane of the lens frame may be accomplished by screw adjustment means mounted on the bridge 30 which regulates the angle of the plane of each lens frame by rotation about its hinge to the bridge 30.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An eyeglass frame for providing individual lines of sight for each eye of the wearer comprising
an eyeglass frame formed of two lens frames each pivotally hinged to a bridge, with each frame adjustably linked to a temple piece and with two mirrors pivotably mounted on parallel axes in each lens frame, so that a line of sight may be directed from one mirror and into an eye of the wearer, in which the axis of rotation of each lens frame to the bridge is in the generally vertical plane and the axis of rotation of each mirror to the associated lens frame is in the generally horizontal plane for the worn position of the eyeglass frame.

2. An eyeglass frame formed of two lens frames, each fixed to a bridge, with each lens frame adjustably linked by a turnbuckle to a temple piece for individual adjustment of the position of each temple piece with relation to the associated lens frame, along the axis of the temple piece.

* * * * *

UNITED STATES PATENT AND TRADEMARK OFFICE
CERTIFICATE OF CORRECTION

PATENT NO. : 4,026,639

DATED : May 31, 1977

INVENTOR(S) : Donald G. Lebo

It is certified that error appears in the above-identified patent and that said Letters Patent is hereby corrected as shown below:

Col. 1, line 33, "is" should be --in--. (2nd occurrence)

Signed and Sealed this

Thirteenth Day of August, 1991

Attest:

HARRY F. MANBECK, JR.

Attesting Officer

Commissioner of Patents and Trademarks